United States Patent [19]

Furui

[11] Patent Number: 5,657,831
[45] Date of Patent: Aug. 19, 1997

[54] PASSENGER PROTECTING APPARATUS AND ACTUATING APPARATUS THEREFOR

[75] Inventor: Takashi Furui, Tokyo, Japan

[73] Assignee: Mitsubishi Denki Kabushiki Kaisha, Tokyo, Japan

[21] Appl. No.: 563,601

[22] Filed: Nov. 28, 1995

[30] Foreign Application Priority Data

Jul. 7, 1995  [JP]  Japan ................................. 7-172131

[51] Int. Cl.$^6$ ................................................ B60R 21/32
[52] U.S. Cl. .................... 180/282; 280/735; 307/10.1; 340/436; 364/424.055
[58] Field of Search ........................... 280/735, 734; 180/282, 274; 307/10.1; 340/436, 438, 669; 364/424.055, 424.056; 200/61.49

[56] References Cited

U.S. PATENT DOCUMENTS

| | | | |
|---|---|---|---|
| 2,402,111 | 6/1946 | Engler | 200/61.49 |
| 3,622,974 | 11/1971 | Best et al. | 340/438 |
| 5,021,678 | 6/1991 | Diller | 280/734 |
| 5,031,931 | 7/1991 | Thuen et al. | 280/735 |
| 5,182,459 | 1/1993 | Okano et al. | 280/735 |
| 5,204,547 | 4/1993 | Schumacher et al. | 280/735 |
| 5,283,472 | 2/1994 | Takeuchi et al. | 280/735 |
| 5,306,883 | 4/1994 | Manandhar et al. | 200/61.53 |
| 5,320,382 | 6/1994 | Goldstein et al. | 280/735 |
| 5,424,501 | 6/1995 | Purves et al. | 200/61.49 |

FOREIGN PATENT DOCUMENTS

5278558  10/1993  Japan .

Primary Examiner—Robert J. Oberleitner
Assistant Examiner—Peter C. English
Attorney, Agent, or Firm—Sughrue, Mion, Zinn, Macpeak & Seas

[57] ABSTRACT

An actuating apparatus for a passenger protecting apparatus the characteristics of which are easily adjusted, and which is small in size, and the cost of which can be suppressed to be inexpensive, has a comparatively simple construction, that is to say, is constructed to combine a mechanical acceleration switch having no mechanism for holding the states of the contacts thereof with electric circuits such as an integrating circuit, a comparing circuit and the like for controlling a semiconductor switch in the igniting circuit thereof.

6 Claims, 11 Drawing Sheets

PASSENGER PROTECTING APPARATUS AND ACTUATING APPARATUS THEREFOR

BACKGROUND OF THE INVENTION

1. Field of the Invention

This invention relates to a passenger protecting apparatus for an automobile such as an air bag, a seat belt pre-tensioner and the like, and further relates to an actuating apparatus therefor.

2. Description of the Prior Art

Figure 11:
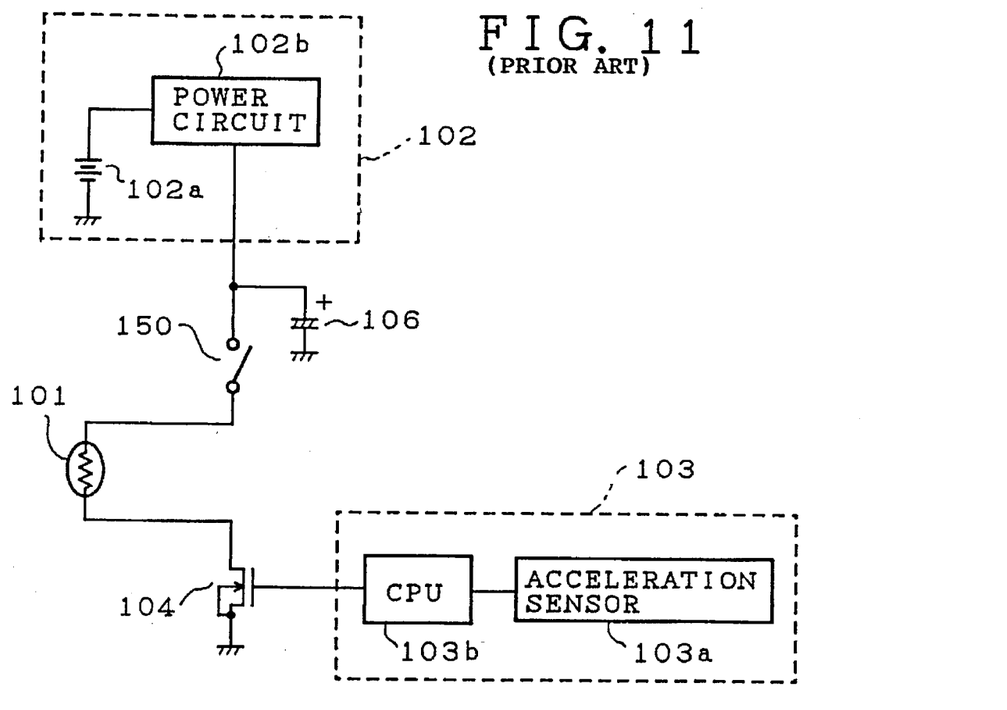
FIG. 11 is a circuit diagram of a conventional actuating apparatus.

FIG. 11 is a circuit diagram showing a conventional igniting circuit apparatus of an air bag which is disclosed in Japanese Published Unexamined Patent Application No. 278558 / 93 (Tokkai-Hei 5-278558). In FIG. 11, reference numeral 101 denotes an igniting device of an air bag called a squib and composed of a resistor such as a heating coil or the like. Reference numeral 102 denotes a power supplying section; reference numeral 102a denotes a battery; reference numeral 102b denotes a power circuit for supplying a current from the battery 102a to the squib 101. Reference numeral 103 denotes a collision judging part; reference numeral 103a denotes an acceleration sensor for outputting the acceleration of a vehicle in the direction of deceleration of the vehicle as an electric signal; reference numeral 103b denotes a CPU receiving the output of the acceleration sensor 103a to judge whether the air bag should be inflated. Reference numeral 104 denotes a semiconductor switch for ignition to be controlled by the CPU 103b. Reference numeral 150 denotes a mechanical acceleration switch which can be actuated by a shock comparatively smaller than one judged by the CPU 103b as a shock to expand the air bag. Reference numeral 106 denotes a capacitor which operates as an auxiliary power supply for ignition.

Next the operation of the conventional actuating apparatus for a passenger protecting apparatus will be described. When a collision of a vehicle has occurred, the acceleration switch 150 provided for preventing a malfunction is closed at first. When the semiconductor switch 104 is closed by the collision judging part 103 after the closure of the acceleration switch 150, an igniting current is supplied from the power supplying section 102 to the squib 101 for actuating the passenger protecting apparatus or the air bag.

In the aforementioned construction of the actuating apparatus, the acceleration switch 150 is provided for preventing a malfunction in the case where the acceleration sensor 103a and the CPU 103b are faulty.

Figure 12:
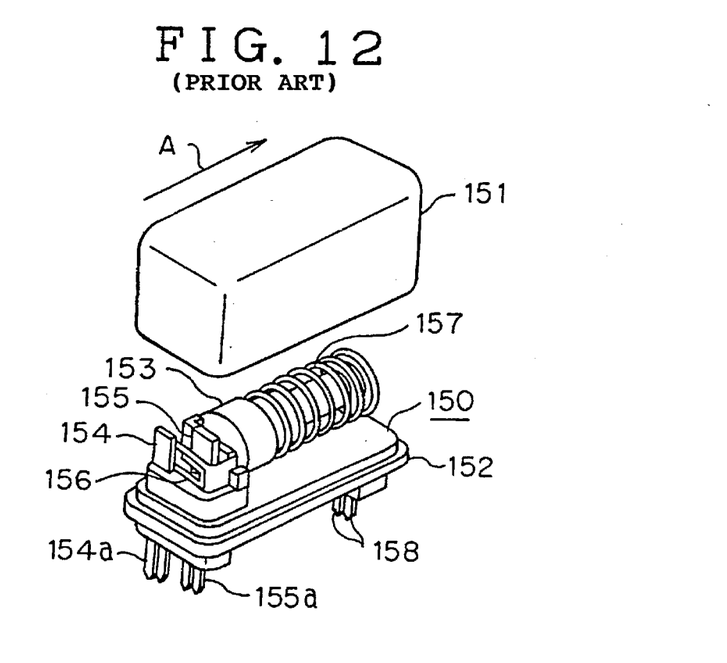
FIG. 12 is a perspective view showing a conventional acceleration switch.

FIG. 12 is a perspective view of a conventional acceleration switch for a passenger protecting apparatus disclosed in U.S. Pat. No. 5,306,883 (Manandhar et al.). In the figure, reference numeral 151 denotes a cover. Reference numeral 152 denotes a base. Reference numeral 153 denotes a cylindrical mass (weight). Reference numerals 154 and 155 denote electrical terminals; reference numerals 154a and 155a denote pins extending from the terminals 154 and 155 respectively. Reference numeral 156 denotes a contact portion made of a blade spring. Reference numeral 157 denotes a coil spring. Reference numeral 158 denotes pins for fixing.

Next, the operation thereof will be described. In the acceleration switch 150 shown in FIG. 12, the terminals 154 and 155 are not electrically connected to each other at an ordinary time because the mass 153 is pressed by the coil spring 157 to push the contact portion 156 open. But when a force caused by an acceleration at a time of collision is impressed in the direction of an arrow A in FIG. 12, the mass 153 moves to the direction of the arrow A, and the contact portion 156 is pressed to the direction of the arrow A by the force of the blade spring to connect the terminals 154 and 155 to each other electrically. After the terminals 154 and 155 are connected to each other, the electrical connection of the terminals 154 and 155 is kept so long as a force stronger than the reaction force of the coil spring 157 is applied in the direction of the arrow A, because the mass 153 tends to move to the direction of the arrow A.

Figure 13A:
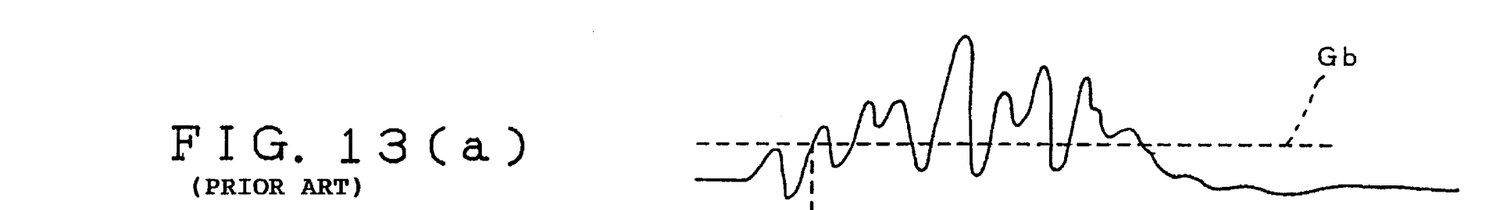
Figure 13B:
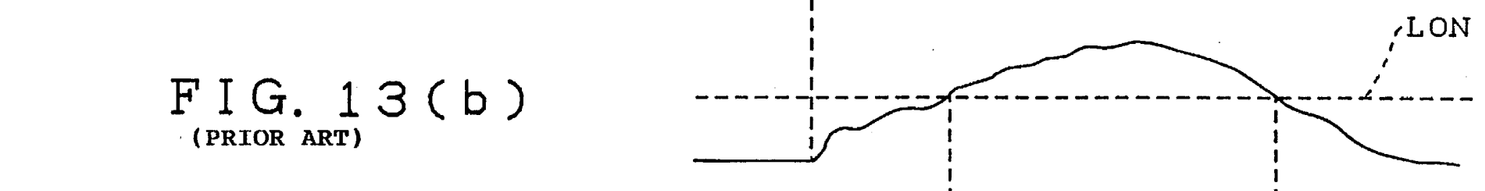
Figure 13C:
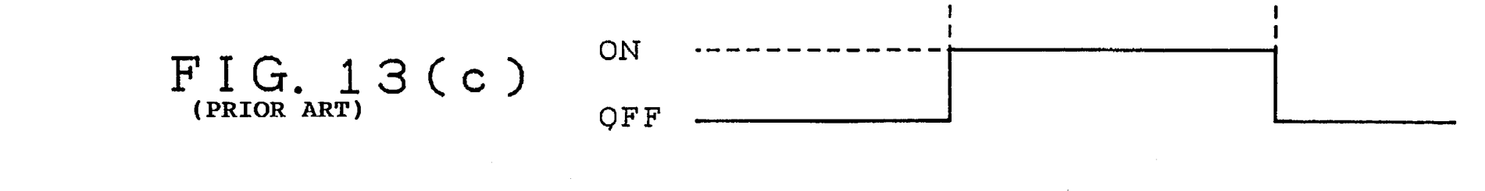

FIG. 13(a)–FIG. 13(c) are waveform diagrams showing states at a time of a collision; FIG. 13(a) is a waveform diagram showing the changes of a collision acceleration generated to the direction of the arrow A, namely the direction of the deceleration of a vehicle at a time of a collision; FIG. 13(b) is a waveform diagram showing the amount of the movement of the mass 153; FIG. 13(c) is a waveform diagram showing the state of opening and closing of the acceleration switch 150. Reference letter Gb shown as a broken line in FIG. 13(a) indicates an acceleration (bias acceleration) which generates a force having the same strength as the spring force of the coil spring 157. When a collision acceleration exceeds the bias acceleration Gb, the mass 153 begins to move as shown in FIG. 13(b). And when the amount of the movement exceeds a certain fixed quantity (shown as a broken line LON in FIG. 13(b)), the contact portion 156 electrically connects the terminals 154 and 155 to each other to turn on the acceleration switch 150. Then, the acceleration switch 150 is kept to be turned on until the amount of the movement of the mass 153 becomes smaller than the fixed quantity LON as shown in FIG. 13(c). Since the acceleration switch 150 is kept to be turned on in such a manner, the operation of the squib is prevented from being unstable or faulty because the acceleration switch alternates between on and off at a collision time.

But, since the aforementioned conventional acceleration switch 150 for the use in an actuating apparatus for a passenger protecting apparatus determines its characteristics only by means of the spring constant of the mechanical spring 157 and the weight and the moving range of the mass 153, it has a problem that it cannot change its characteristics by a large margin.

Besides, the time for keeping the electrical conduction is required to be longer than a certain degree, and the conventional acceleration switch 150 answers the request by setting the distance of the movement of the mass of the switch 150 to be long. Consequently, the length of the switch in the direction of the arrow A in FIG. 12 cannot be shorter than a certain fixed length. Accordingly, the size of the whole apparatus needs to be large, and then the switch 150 has a high cost.

Besides, in an acceleration switch opening and closing its contacts mechanically by means of a mass, there inevitably happens a chattering phenomenon in its contact portions, namely its contacts part from each other due to the reaction of contacting to be contacted and separated intermittently. That is to say, the conventional acceleration switch has a problem that the conduction thereof becomes intermittent.

Besides, if the aforementioned actuating apparatus is used in a passenger protecting apparatus having a plurality of squibs, and the power supplied to each squib is independent in order that the other squibs will not malfunction if one squib is faulted, for example by mis-ignition caused by a failure such as a short circuit or the like. For that purpose, a plurality of acceleration switches shown in FIG. 12 are required, and consequently, the space for mounting such switches becomes large, and the cost of the apparatus increases.

SUMMARY OF THE INVENTION

In view of the foregoing, it is an object of the present invention to provide a passenger protecting apparatus and an actuating apparatus therefor the characteristics of the acceleration switch of which can easily be adjusted, and which are small in size, and further the cost of which can be suppressed to be low.

It is another object of the present invention to provide a passenger protecting apparatus and an actuating apparatus therefor which can operate even if the operation of the acceleration switch thereof becomes unstable.

It is a further object of the present invention to provide an actuating apparatus for a passenger protecting apparatus which does not malfunction even if the acceleration switch thereof malfunctions.

It is a further object of the present invention to provide an actuating apparatus for a passenger protecting apparatus which can operate each actuating means even if a trouble such as the breaking of a wire or the like occurs in the power supplying section thereof.

According to an aspect of the present invention, for achieving the above-mentioned objects, there is provided an actuating apparatus for a passenger protecting apparatus comprising an acceleration switch opening and closing in accordance with a movement of a mass caused by an acceleration of a vehicle, an integrating circuit for integrating the signal output from the acceleration switch, and an actuating section for actuating a passenger protecting apparatus when an output of the integrating circuit is within a predetermined range. An analog acceleration sensor is provided for detecting a deceleration of the vehicle. A second actuating section (preferably a CPU) is provided for actuating a passenger protecting apparatus depending on the output of the analog sensor.

As stated above, since the actuating apparatus comprises a mechanical acceleration switch an analog acceleration sensor if the, mechanical acceleration switch operates intermittently due to the over-movement of the mass or the like, the integrating circuit outputs the signal for opening and closing output in accordance with the state of opening and closing after integrating the signal. Consequently, a safe and stable operation is achieved.

According to another aspect of the present invention, there is provided an actuating apparatus for a passenger protecting apparatus comprising a mechanical acceleration switch, an integrating circuit for integrating a signal for opening and closing output from the acceleration switch, a comparator for outputting a first predetermined signal when an output of the integrating circuit is within a predetermined range, an analog acceleration sensor for detecting an acceleration of the vehicle, a CPU for outputting a second predetermined signal on a basis of an acceleration detected by the analog acceleration sensor, a first and second switch operable one the basis of the first and the second predetermined signals, respectively and a squib serially connected between the first and second switches.

According to yet another aspect of the present invention, there is also provided an output holding circuit receiving the output of the comparator and outputting a predetermined signal for a predetermined time period.

According to a further aspect of the present invention, the actuating apparatus also comprises a power supplying section and a plurality of capacitors connected to the power supplying section through diodes.

A feature of the is aspect is that even if the breaking of a wire occurs in the power supplying section at a time of a collision of the vehicle, each actuating section can separately operate by means of a current flowed out of each capacitor separated by the diodes.

BRIEF DESCRIPTION OF THE DRAWINGS

Further objects and advantages of the present invention can be more fully understood from the following detailed description taken in conjunction with the accompanying drawings, in which:

FIG. 5(a)–FIG. 5(f) are timing charts for illustrating the operation of the embodiment 1;

FIG. 13(a)—FIG. 13(c) are timing charts showing the operation of the conventional actuating apparatus.

DETAILED DESCRIPTION OF THE PREFERRED EMBODIMENTS

Preferred embodiments of the present invention will now be described in detail with reference to the accompanying drawings.

EMBODIMENT 1.

Figure 1:
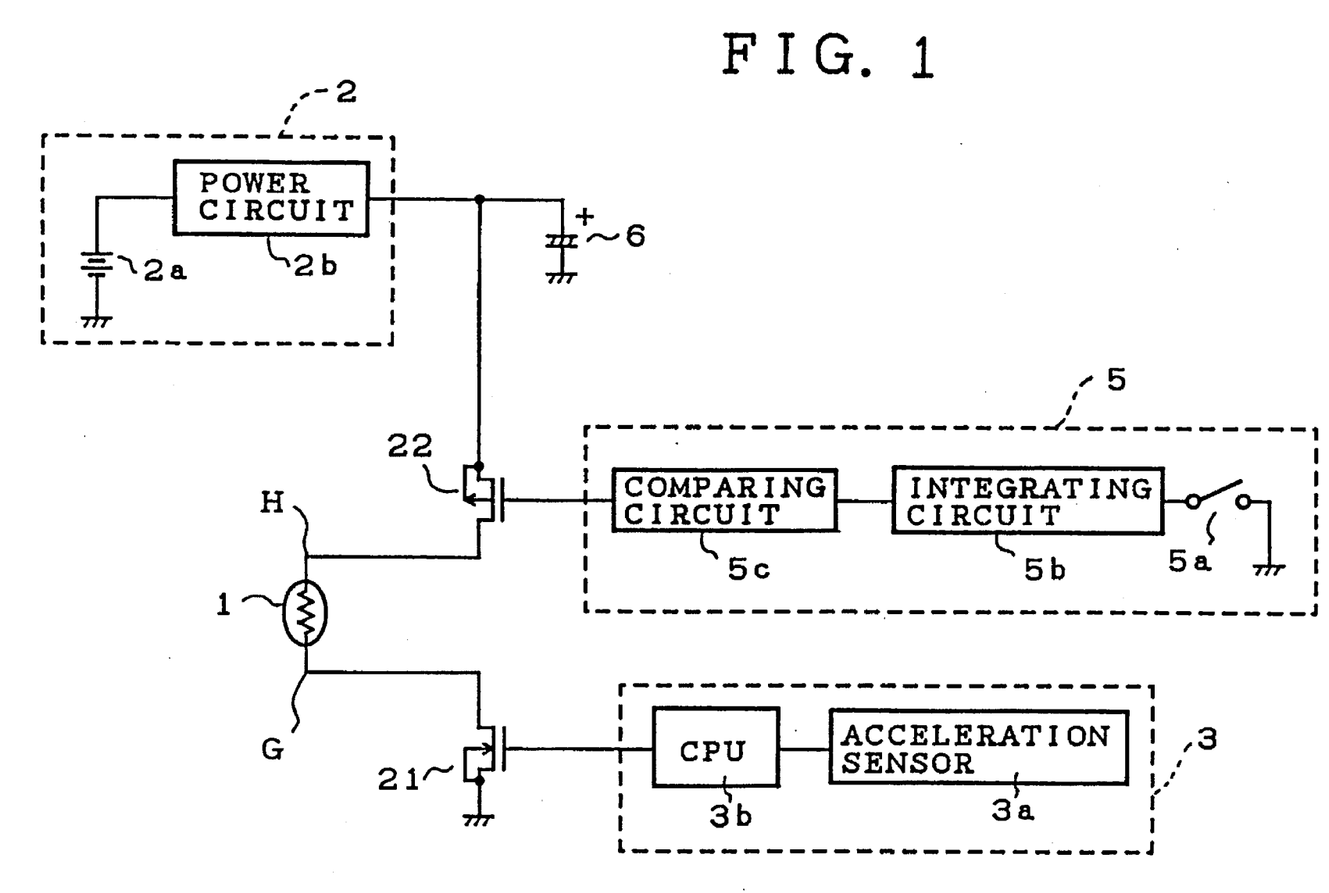
FIG. 1 is a circuit diagram of the actuating apparatus for a passenger protecting apparatus according to a first embodiment (embodiment 1) of the present invention.

FIG. 1 is a circuit diagram showing embodiment 1. In the figure, reference numeral 1 denotes an igniting device called a squib as an actuating section of an air bag for expanding the air bag by generating a gas in the air bag by heating a heater such as a heating coil or the like. Reference numeral 2 denotes a power supplying section; reference numeral 2a denotes a battery; reference numeral 2b denotes a power circuit for supplying a predetermined current from the battery 2a to the squib 1 and a capacitor 6 (to be described later). Reference numeral 3 denotes a first collision judging part; reference numeral 3a denotes an acceleration sensor for outputting an acceleration in a direction of the deceleration of a vehicle at a time of a collision as an electric signal; reference numeral 3b denotes a CPU as a second signal outputting circuit receiving an output of the acceleration sensor 3a to judge the necessity to expand the air bag, namely the necessity of the opening or the closing of a semiconductor switch 21 (to be described later). The acceleration sensor 3a is a sensor which outputs an acceleration in a form of an analogue voltage signal such as a semiconductor piezoresistance type sensor, a piezoelectric type sensor, a capacitance type sensor or the like. Those sensors generally called electric acceleration sensors have better accuracy but more easily malfunction due to a disturbance electromagnetic wave in comparison with mechanical acceleration sensors.

Reference numeral 21 denotes a semiconductor switch as an opening and closing circuit for ignition to be controlled by the CPU 3b. Reference numeral 5 denotes a second collision Judging part which is set to operate by a comparatively smaller shock in comparison with a shock which actuates the acceleration sensor 3a; reference numeral 5a denotes a mechanical acceleration switch; reference numeral 5b denotes an integrating circuit; reference numeral 5c denotes a comparing circuit as a first signal outputting circuit. Reference numeral 22 denotes a semiconductor switch to be controlled by the comparing circuit 5c. Reference numeral 6 denotes a capacitor which operates as an auxiliary power supply for ignition. As described above, the embodiment is provided with a plurality of collision Judging parts different in characteristic and kind to judge a collision in accordance with each characteristic, and thereby, there can be obtained an actuating apparatus for an air bag which operates more surely and with less malfunctions.

Moreover, the embodiment uses an N-channel FET (field effect transistor) as the semiconductor switch 21, and a P-channel FET as the semiconductor switch 22 as shown in FIG. 1, and the source sides of the FET's are connected to the power supply or the ground which are comparatively stable in voltage. Consequently, the operation of the semiconductor switches 21 and 22 are stabilized.

Although the embodiment uses semiconductor switches 21 and 22, the switches 21 and 22 may be any other type switches such as a mechanical switch or the like provided that they are opened or closed in conformity with a predetermined signal.

Figure 2:
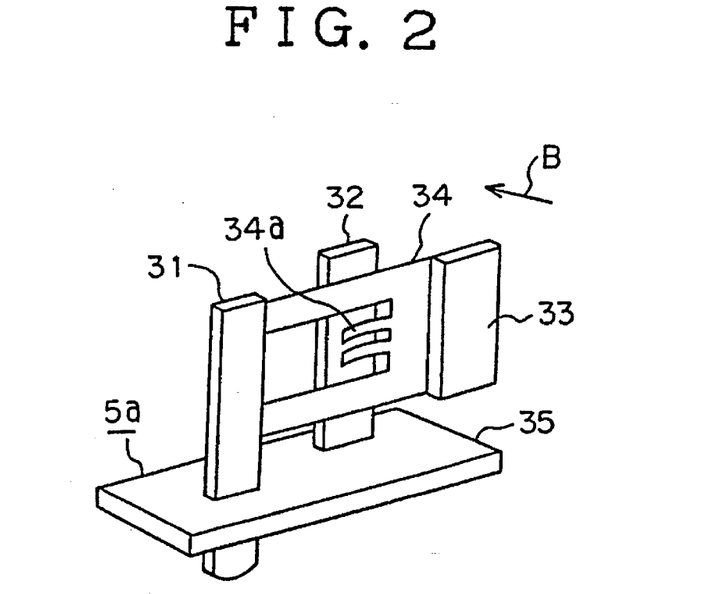
FIG. 2 is a perspective view of an acceleration switch in the embodiment 1.

FIG. 2 is a perspective view showing the mechanical acceleration switch 5a. In the figure, reference numerals 31 and 32 denote terminals made of a metal plate for the conduction of electricity. Reference numeral 33 denotes a mass. Reference numeral 34 denotes a blade spring, one side of which is fixed to the terminal 31 to be connected electrically, and the other side of which is connected to the mass 33, and further the central portions of which are provided with contacts 34a. Reference numeral 35 denotes a pedestal for fixing the terminals 31 and 32.

Figure 3:
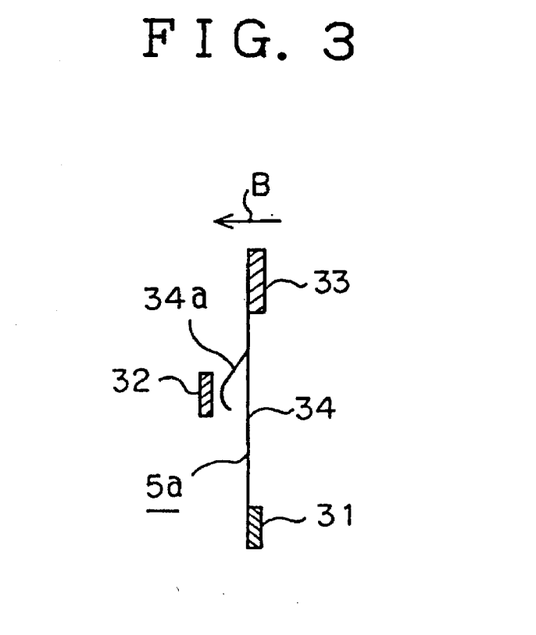
FIG. 3 is a cross sectional view of the acceleration switch shown in FIG. 2.

FIG. 3 is a cross sectional view of the mechanical acceleration switch 5a. There are contacts 34a in the center of the blade spring 34. When the mass 33 moves to the direction of an arrow B in FIG. 3 at a time of a collision (the direction of the deceleration of a vehicle at that time), the blade spring 34 flexes and the contacts 34a contact the terminal 32, and thereby the terminals 31 and 32 are electrically connected.

The mechanical acceleration switch 5a shown in FIG. 2 and FIG. 3 is simplified in construction in comparison with the acceleration switch 150 shown in FIG. 12, and the amount of the movement of the mass 33 is less than that of the mass 153.

That is to say, since the construction is simplified, the number of the parts thereof can be decreased and the cost of manufacturing can be reduced. But, since the amount of the movement of the mass 33 is small and the construction thereof does not hold the contact between the contacts 34a and the terminal 32, the time of electrically connecting the terminals 31 and 32 at a time of a collision is short.

Figure 10:
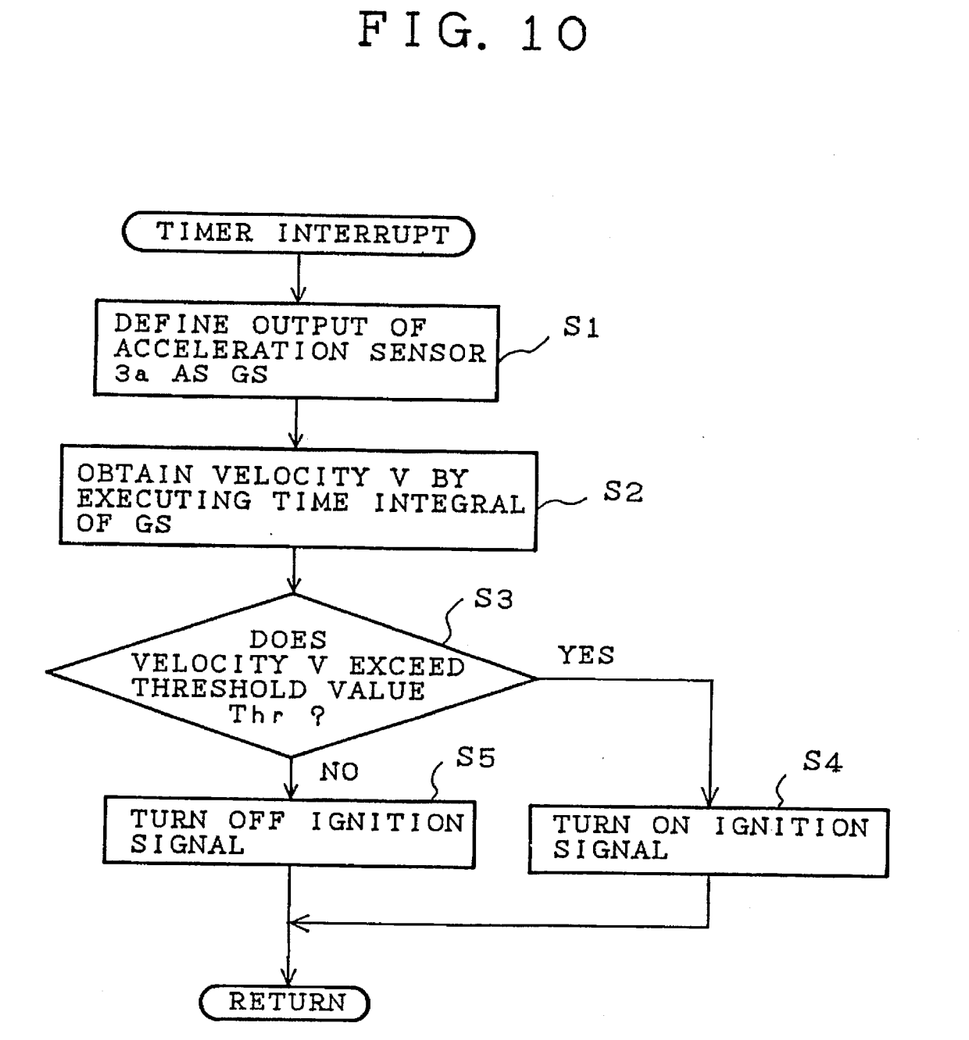
FIG. 10 is a flow chart showing the collision judging processes/of the embodiment 1.

An example of collision judging processes executed in the CPU 3b is shown in FIG. 10. The process shown in FIG. 10 is a timer interrupt process executed every fixed time. At step S1, an output of the acceleration sensor 3a is taken in to be defined as Gs. At step S2, a velocity V is obtained by executing the time integral of Gs. At step S3, the Velocity V is compared with a predetermined threshold value Thr. If the velocity V is the threshold value Thr or more, the process goes to step S4 for turning on an igniting signal. If the velocity V is smaller than the threshold value Thr, the process goes to step S5 for turning off the igniting signal. Since such outputs from the first collision judging part 3 are set to be output at a time of detecting an acceleration larger than one which makes the second collision Judging part 5 output an igniting signal, the output of the second collision detecting part 5 is required to be held for a fixed time.

Figure 4:
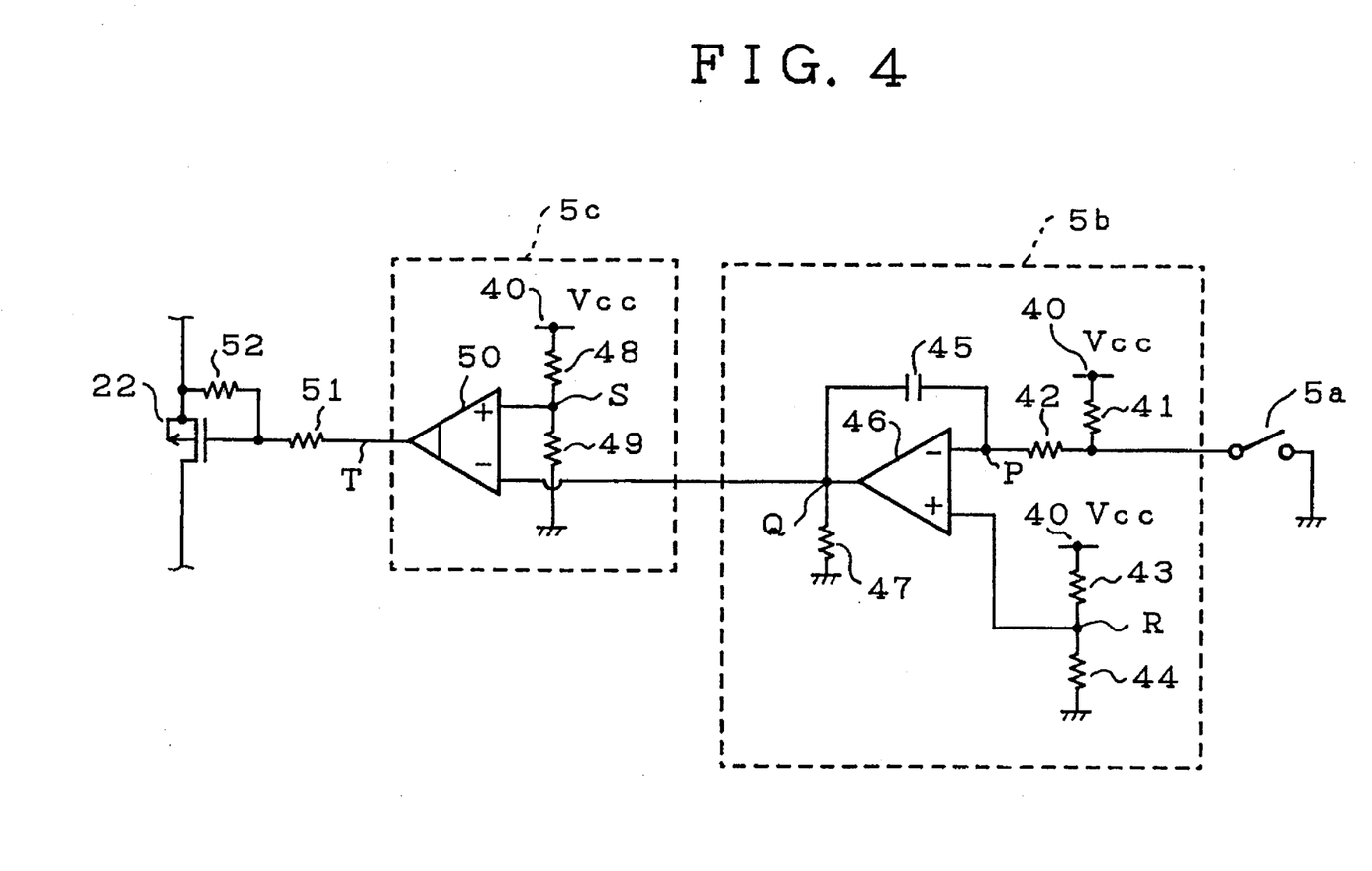
FIG. 4 is a circuit diagram of a second collision judging part in the embodiment 1.

FIG. 4 is a circuit diagram showing the second collision judging part 5 and the semiconductor switch 22. In the figure, reference numeral 40 denotes an input terminal of a reference voltage Vcc. Reference numerals 41 and 42 denote resistors connected to the mechanical acceleration switch 5a; the other end of the resistor 41 is connected to the reference voltage Vcc; the other end of the resistor 42 is connected to the inverting input terminal of an operational amplifier 46. A voltage obtained by dividing the reference voltage Vcc by resistors 43 and 44 is input to the non-inverting input terminal of the operational amplifier 46. The operational amplifier 46 composes an integrator with a capacitor 45 connected between the inverting input terminal and the output terminal of the operational amplifier 46. Reference numeral 47 denotes a resistor for pulling down the output terminal of the operational amplifier 46. The output terminal of the operational amplifier 46 is connected to the inverting input terminal of a comparator 50. A voltage obtained by dividing the reference voltage Vcc by resistors 48 and 49 is input to the non-inverting input terminal of the comparator 50. The output terminal of the comparator 50 is an open collector which gives voltages to the gate and the source of the semiconductor switch 22, which is a P-channel FET, through resistors 51 and 52 at a time of being turned on for closing the semiconductor switch 22.

Figure 5A:
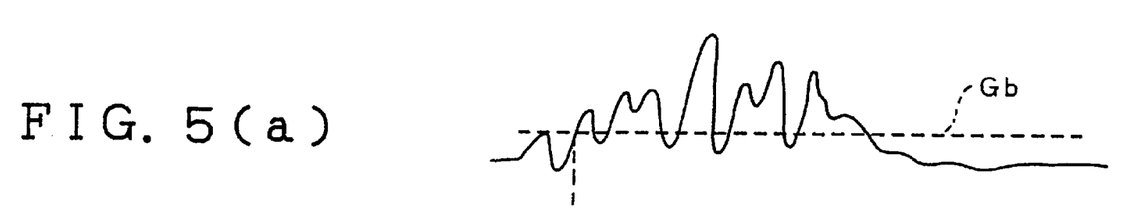
Figure 5B:
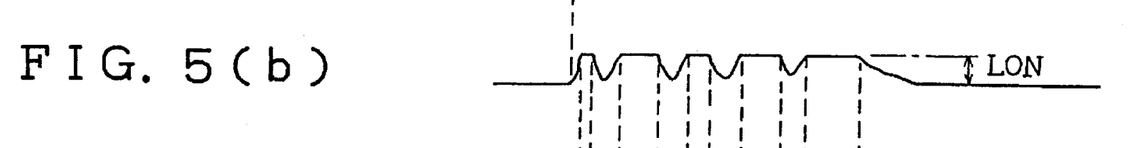
Figure 5C:
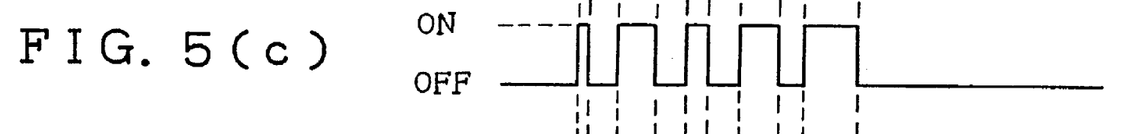

Next the operation of the embodiment 1 will be described with reference to FIG. 5(a)–FIG. 5(f). FIG. 5(a) shows a collision acceleration waveform generated in the direction of the arrow B in FIG. 2 and FIG. 3, namely the deceleration direction of a vehicle. Reference letter Gb shown as a broken line in FIG. 5(a) indicates an acceleration (bias acceleration) which generates a force having the same strength as the spring force of the blade spring 34 shown in FIG. 3. When a collision acceleration exceeds the bias acceleration Gb, the mass 33 shown in FIG. 3 begins to move as shown in FIG. 5(b). And when the amount of the movement of the mass 33 reaches to a certain fixed quantity (shown as a broken line LON in FIG. 5(b)), the contacts 34a contact the terminal 32 to turn on the acceleration switch 5a as shown as "ON" in FIG. 5(c). Since the acceleration switch 5a in FIG. 3 has no mechanism for holding the "ON" state of the contacts, if a collision acceleration changes to be less than the bias acceleration Gb, the mass 33 returns as shown in FIG. 5(b), and the acceleration switch turns off at once as shown as "OFF" in FIG. 5(c). When the acceleration switch is in a state shown in FIG. 5(c), an input to the integrator composed of the operational amplifier 46 shown in FIG. 4, or a voltage at the point P in FIG. 4, takes a waveform shown in FIG. 5(d).

Figures 5D, 5E:
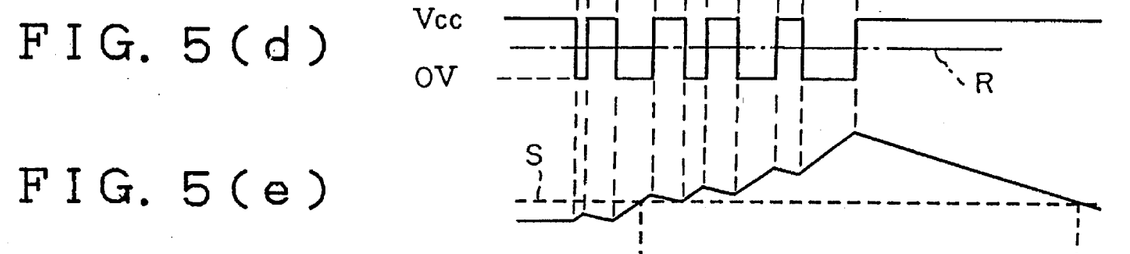
Figure 5F:
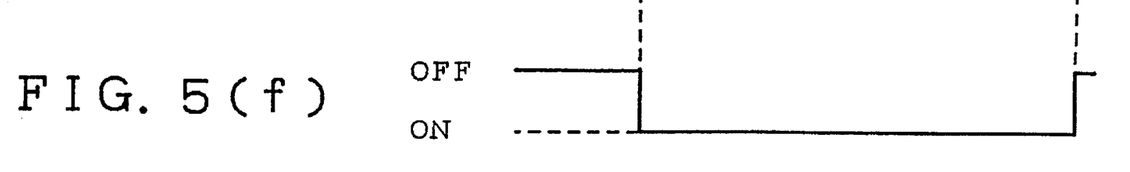

An integration input is inverted to be integrated on the basis of the electric potential at the point R in FIG. 4, and then an integration output as shown in FIG. 5(e) appears at the point Q in FIG. 4. The integration output shown in FIG. 5(e) is compared with the electric potential at the point S in FIG. 4. If the integration output exceeds the electric potential at the point S, a low active output of the comparator 50 is turned on. The ON state continues until the collision waveform becomes smaller so that the integration output becomes less than the electric potential at the point T. Thereby, the ON state can be held longer than that of the conventional mechanical acceleration switch described in the section of "BACKGROUND OF THE INVENTION". While the ON state continues, the semiconductor switch 22 is in a closed state (conducted state). If the semiconductor switch 21 is also closed state at that time, a current is supplied to the squib 1 to actuate the squib 1 for expanding the air bag.

The change of the characteristics of the second collision judging part 5 and the adjustment thereof can be done only by exchanging the electric parts such as the resistors, the capacitor or the like shown in FIG. 4, or by adjusting them. For example, if a variable resistor is used, the adjustment can easily be done.

In the embodiment 1, the second collision judging part 5 is actuated by an acceleration smaller than the acceleration which actuates the first collision judging part 3, but the relative size of the acceleration which actuates the collision judging parts 3 and 5 may be vice versa, or may be the same.

In the embodiment 1, the first collision judging part 3 is connected to the semiconductor switch 21 and the second collision judging part 5 is connected to the semiconductor switch 22, but the connections may be exchanged, that is to say, the second collision judging part 5 may be connected to the semiconductor switch 21 and the first collision judging part 3 may be connected to the semiconductor switch 22. Moreover, since the amount of the acceleration which actuates the first collision judging part 3 is adjusted to be larger than the amount of the acceleration which actuates the second collision judging part 5 in this case, even if the ground side of the squib 1 (for example, the point G in FIG. 1) is grounded to disable the semiconductor switch 21 from switching, the actuating apparatus can operate normally.

EMBODIMENT 2.

Figure 6:
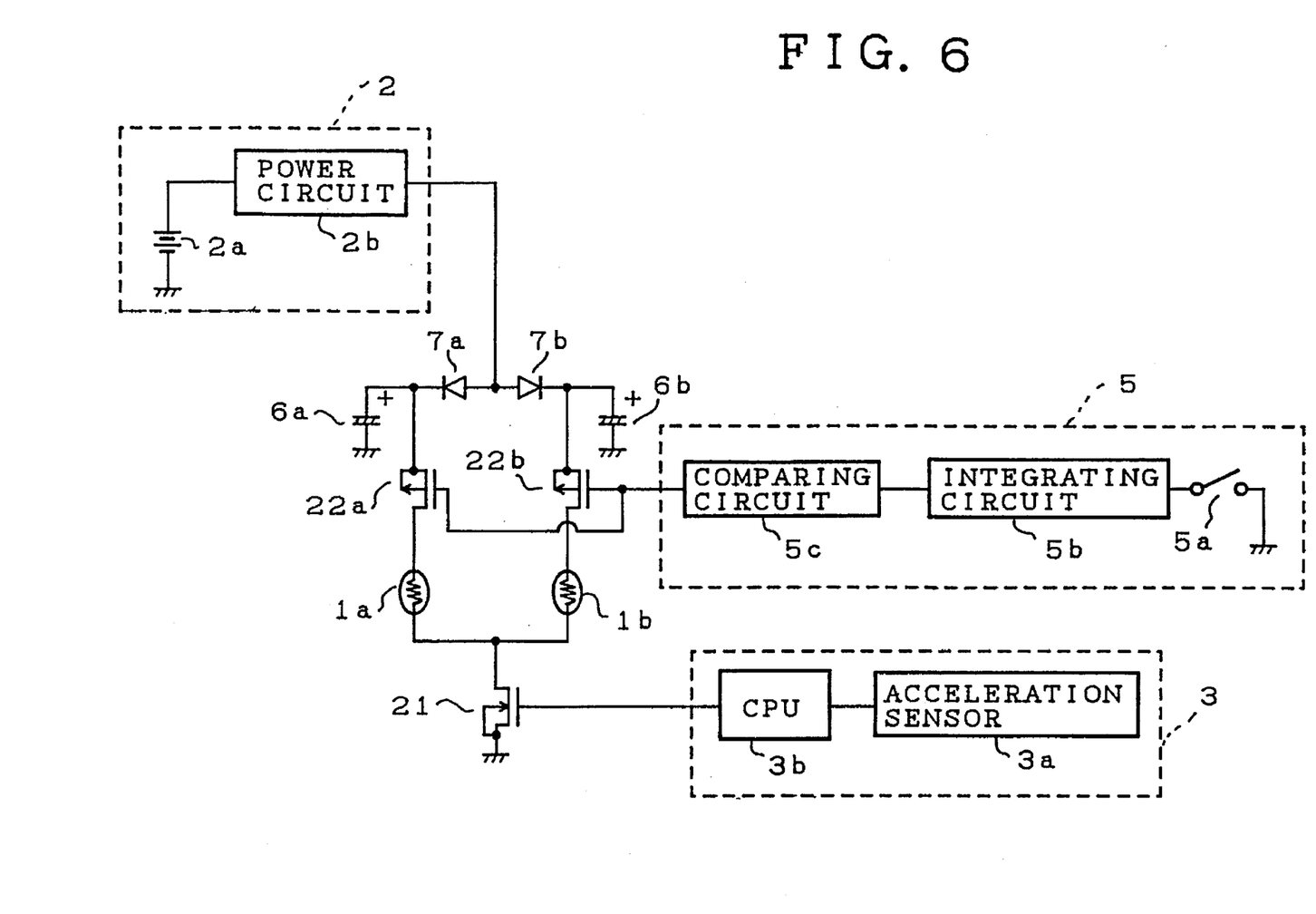
FIG. 6 is a circuit diagram of the actuating apparatus for a passenger protecting apparatus according to a second embodiment (embodiment 2) of the present invention.

FIG. 6 is a circuit diagram showing the embodiment 2. The embodiment 2 concerns a case where a plurality of air bags, for example an air bag for a driver's seat and an air bag for a passenger seat, are needed. In FIG. 6, reference numerals 1a and 1b denote squibs for expanding the air bags for the driver's seat and the passenger seat respectively. Reference numerals 22a and 22b denote semiconductor switches connected to each squib 1a and 1b respectively. Reference numerals 6a and 6b denote capacitors for the use of auxiliary power supplies for each squib 1a and 1b respectively. Reference numerals 7a and 7b denote diodes for supplying a current for each squib 1a and 1b respectively.

The other elements which have the same constructions as those of the embodiment 1 are denoted by the same reference characters as those of the embodiment 1, and the descriptions for them are omitted.

The construction of the igniting circuit of the embodiment 2 can ignite each air bag in the driver's seat and the passenger seat independently by inserting the diodes 7a and 7b. That is to say, even if one of the squibs is short-circuited, the capacitors 6a and 6b discharge only for their respective squib. By constructing the igniting circuit as described above, the actuating apparatus of the embodiment 2 can be constructed by using only two semiconductor switches to be connected to the second collision judging part 5, namely the semiconductor switches 22a and 22b, without increasing the numbers of acceleration switch 5a, the integrating circuit 5b and the comparing circuit 5c of the second collision judging part 5.

Even if the battery 2a gets out of its place at a time of a collision, since a current is supplied to the squibs 1a and 1b from the capacitors 6a and 6b respectively, the squibs 1a and 1b can operate separately.

In the present embodiment, the case where two squibs are used was described, but it is a matter of course that the igniting circuit can be similarly constructed to have two or more squibs.

EMBODIMENT 3.

Figure 7:
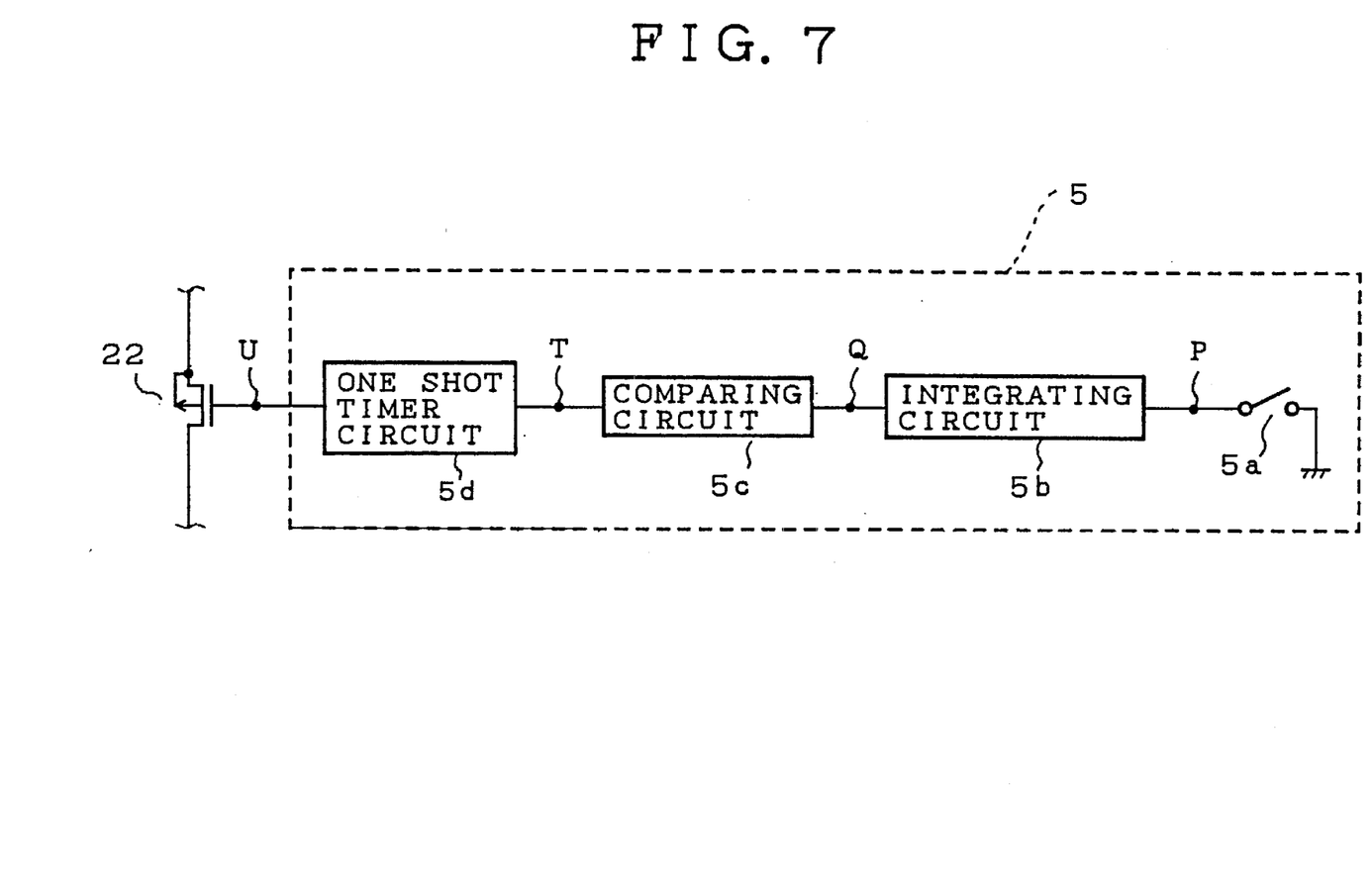
FIG. 7 is a circuit diagram of a third embodiment (embodiment 3) of the present invention.
Figure 8A:
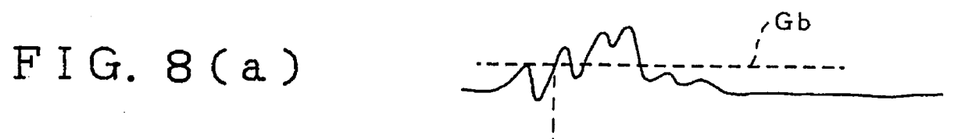
FIG. 8(a) FIG. 8(g) are timing charts for illustrating the operation of the embodiment 3.
Figure 8B:
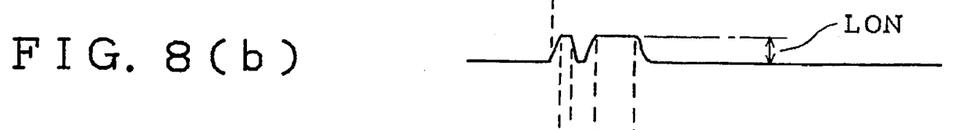
Figure 8C:
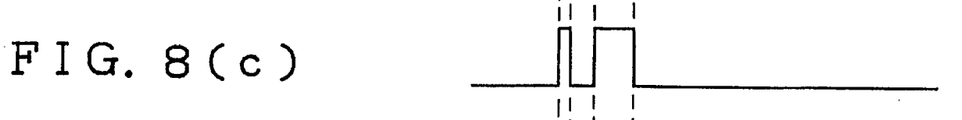
Figure 8D:
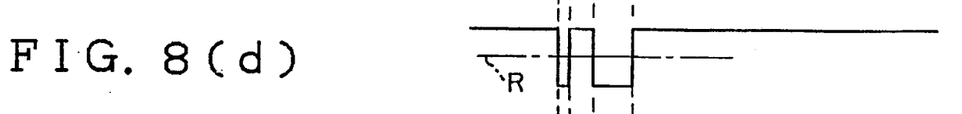
Figure 8E:
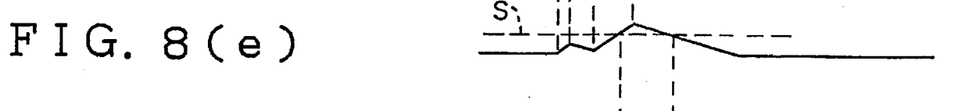
Figure 8F:
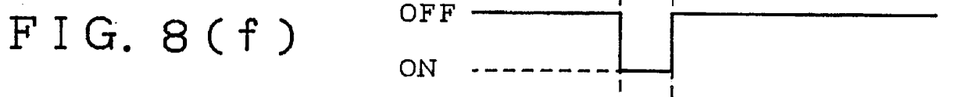
Figure 8G:
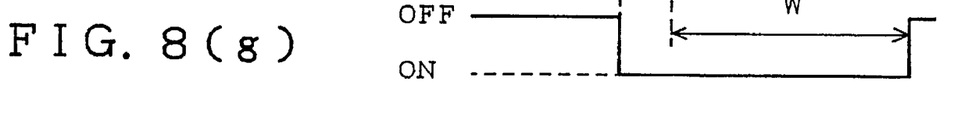

FIG. 7 is a circuit diagram showing the embodiment 3 of the present invention. FIG. 8(a)–FIG. 8 (g) are waveform diagrams showing states at a time of a collision. FIG. 7 shows only the part corresponding to the second collision judging part 5 and the semiconductor switch 22 in the embodiment 1. In FIG. 7, reference numeral 5d denotes a one shot timer circuit connected to the comparing circuit 5c as an output holding circuit for performing an operation for holding an input pulse for a certain time. The other constructions of the circuit of FIG. 7 are the same as those of the embodiment 1, and the descriptions for them are omitted.

Next, the operation thereof will be described with reference to FIG. 8 (a)–FIG. 8 (g). Since FIG. 8(a)–FIG. 8(f) show waveforms similar to those of FIG. 5(a)–FIG. 5 (f), detailed descriptions for them are omitted. But, since the waveform of a collision acceleration Shown in FIG. 8(a) of the embodiment 3 is smaller and shorter than that shown in FIG. 5(a), the pulse width of an output of the comparing circuit shown in FIG. 8(f) becomes considerably narrower. But, since the one shot timer circuit 5d is provided as shown in FIG. 7, as shown in FIG. 8(g), an output of the one shot timer circuit 5d (a voltage at the point U in FIG. 7) can hold the ON state thereof further for a fixed time W from the end of the output pulse of the comparing circuit shown in FIG. 8(f). Since the ON state of an output of the one shot timer circuit 5d can be held for the fixed time, the operation of the squib 1 can further be ensured.

The embodiment 3 is provided with the one shot timer circuit 5d for holding the output of the comparing circuit 5c, but other constructions for holding the closed state of an opening and closing circuit, for example a mechanical switch equipped in place of the semiconductor switch 22 and provided with a spring at a contact part of the mechanical switch for holding the contact thereof for a predetermined time, may be employed.

EMBODIMENT 4.

Figure 9:
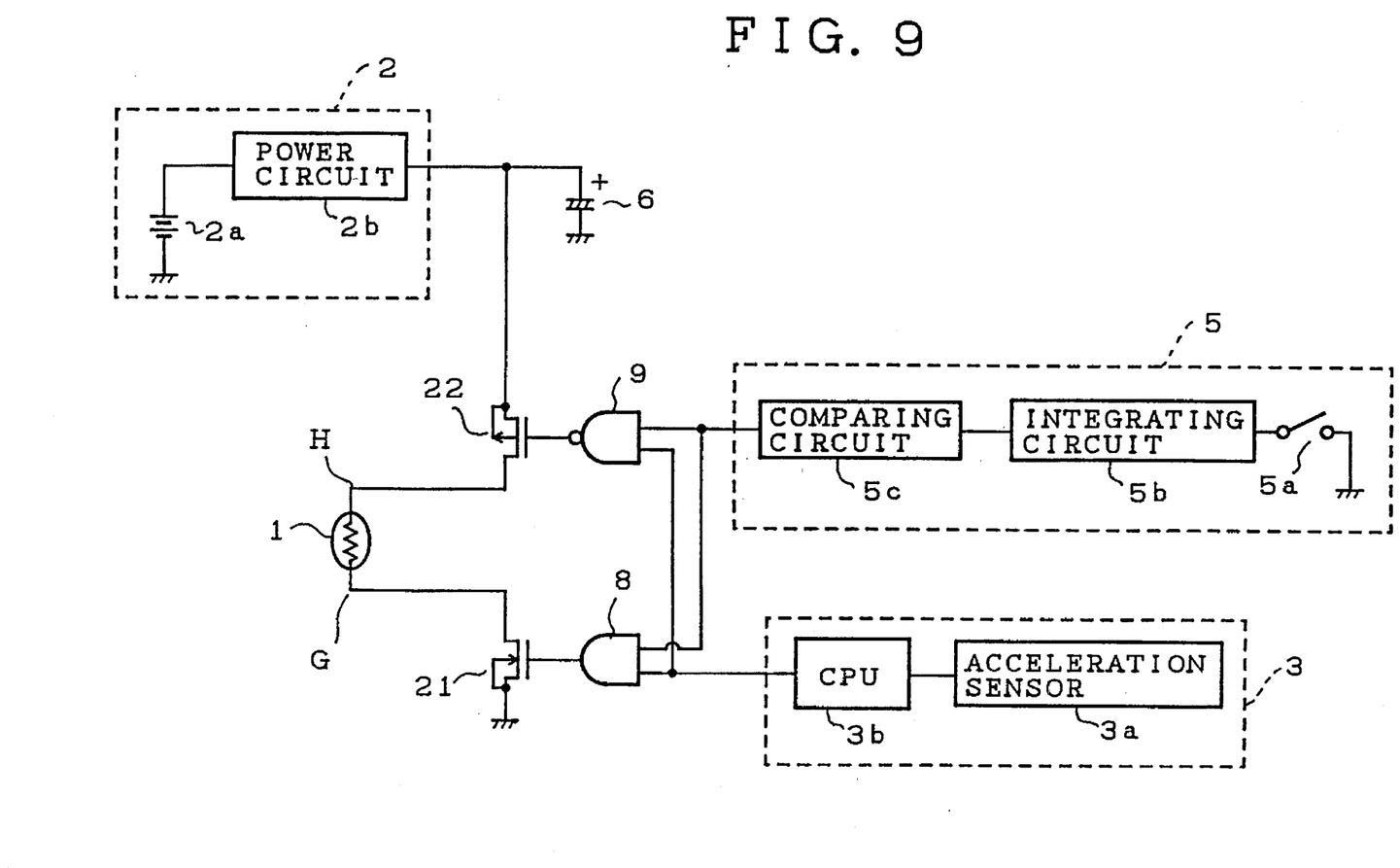
FIG. 9 is a circuit diagram of the actuating apparatus for a passenger protecting apparatus according to a fourth embodiment (embodiment 4) of the present invention.

FIG. 9 is a circuit diagram for illustrating the embodiment 4. In the figure, reference numerals 8 and 9 denote logical product circuits; reference numeral 8 denotes an AND circuit; reference numeral 9 denotes a NAND circuit. The elements of the embodiment 4 same as those of the embodiment 1 shown in FIG. 1 are denoted by the same reference characters and the descriptions for them are omitted. In FIG. 9, the first collision judging part 3 is high active (ON at a time of the HIGH level) similarly in the embodiment 1. But, the second collision judging part 5 is set to be high active in the present embodiment, although it is low active (ON at a time of the LOW level) in the embodiment 1. When both of the first and the second collision judging parts 3 and 5 are ON, namely when ignition is executed, the output level of the logical product circuit 8 becomes HIGH and the output level of the logical product circuit 9 becomes LOW to turn on respective semiconductor switches 21 and 22 at the same time.

Since, in the aforementioned embodiment 1, the second collision judging part 5 operates even by a comparatively slight shock, there is the possibility that the squib 1 malfunctions to be ignited when short-circuiting or grounding occurs on the low level side of the squib 1 (for example, the point G in FIG. 1 and FIG. 9) and the high level side thereof (for example, the point H in FIG. 1 and FIG. 9). For preventing the phenomenon, a switch similar to the semiconductor switch 21 for ignition is required to be inserted on the high level side of the squib 1, but it is not preferable in the aspects of cost and space utility to increase the number of semiconductor switches for a large current (they are generally expensive). Accordingly, in the present embodiment 4, the logical products of the outputs of the first collision judging part 3 and the second collision judging part 5 are used as an input to the semiconductor switches 22 and 21 on the power supply side and the ground side of the igniting circuit.

As described above, in the present embodiment, since the logical products of the outputs of the first and the second collision judging parts are operated in the igniting circuit or a previous stage of the squib 1 for making it possible to save an actuating apparatus from the failure of the grounding or the short-circuiting of the squib without increasing the number of semiconductor switches for a large current, the actuating apparatus for a passenger protecting apparatus which is low in cost and high in reliability can be obtained.

In each aforementioned embodiment actuating apparatus for air bags were described, the actuating apparatus can be used in other passenger protecting apparatus which operate at a time of a collision of a vehicle such as a seat belt pre-tensioner for giving a predetermined tension to a seat belt at a time of a collision, an apparatus for aiding a passenger in the occupant's escape by unlocking a door lock at a time of a collision, or the like.

In each aforementioned embodiment acceleration switches having normally opened contacts are used, but acceleration switches having normally closed contacts may be used.

An actuating apparatus for a passenger protecting apparatus can surely operate even if the operation of the acceleration switch thereof becomes unstable.

Besides, if the acceleration switch thereof malfunctions, the passenger protecting apparatus provided with the actuating apparatus of the present invention never malfunctions.

Besides, if a failure such as the breaking of a wire, or the like in the power supplying section thereof, each actuating section of the actuating apparatus of the present invention can surely be actuated.

A passenger protecting apparatus according to the present invention can surely operate even if the operation of the acceleration switch becomes unstable.

While preferred embodiments of the present invention have been described using specific terms, such description is for illustrative purposes only, and it is to be understood that changes and variations may be made without departing from the spirit or scope of the following claims.

What is claimed is:

1. An actuating apparatus for a passenger protecting device, comprising:

a first deceleration detecting circuit comprising an analog acceleration sensor connected to a microprocessor, the output of said microprocessor controlling a first switch;

a second deceleration detecting circuit having response characteristics different from the first deceleration detecting circuit, comprising:

a mechanical acceleration sensor;

an integrator receiving and integrating the output of the mechanical acceleration sensor;

a comparator receiving and comparing the output of the integrator to a reference signal, the output of the comparator controlling a second switch;

wherein a squib is serially connected between said first and second switches.

2. The actuating apparatus of claim 1, wherein the output of said comparator further controls a third switch, and wherein a second squib is serially connected between said first and third switches.

3. An actuating apparatus for a passenger protecting device, comprising:

a first deceleration detecting circuit comprising:

an analog acceleration sensor connected to a microprocessor, the output of said microprocessor controlling a first switch;

a second deceleration detecting circuit having response characteristics different from the first deceleration detecting circuit, comprising:

a mechanical acceleration sensor;

an integrator receiving and integrating the output of the mechanical acceleration sensor;

a comparator receiving and comparing the output of the integrator to a reference signal;

a one-shot timer circuit receiving the output of the comparator and controlling a second switch in accordance with the output of the comparator;

wherein a squib is serially connected between said first and second switches.

4. The actuating apparatus of claim 3, wherein the output of said comparator further controls a third switch, and wherein a second squib is serially connected between said first and third switches.

5. An actuating apparatus for a passenger protecting device, comprising:

a first deceleration detecting circuit comprising an analog acceleration sensor connected to a microprocessor;

a second deceleration detecting circuit having response characteristics different from the first deceleration detecting circuit, comprising:

a mechanical acceleration sensor;

an integrator receiving and integrating the output of the mechanical acceleration sensor;

a comparator receiving and comparing the output of the integrator to a reference signal;

wherein said actuating apparatus further comprises:

an AND gate receiving the outputs of the first and second deceleration detecting circuits and controlling a first switch in accordance with said outputs;

a NAND gate receiving the outputs of the first and second deceleration detecting circuits and controlling a second switch in accordance with said outputs;

a squib serially connected between said first and second switches.

6. The actuating apparatus of claim 5, wherein said second deceleration detecting circuit further comprises a one-shot timer circuit receiving the output of the comparator and sending an output to said AND and NAND gates.

* * * * *